United States Patent
Nabizada et al.

(10) Patent No.: US 12,202,371 B2
(45) Date of Patent: Jan. 21, 2025

(54) DYNAMIC OUTPUT CONTROL OF VEHICLE CHARGERS WITH RESPECTIVE INTERNAL BATTERIES

(71) Applicant: SPEED CHARGE, LLC, Carter Lake, IA (US)

(72) Inventors: Jamshed Nabizada, Fremont, CA (US); Ravi Lavu, Fremont, CA (US); Ajay Somepalli, Fremont, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

(21) Appl. No.: 18/145,103

(22) Filed: Dec. 22, 2022

(65) Prior Publication Data

US 2024/0208354 A1 Jun. 27, 2024

(51) Int. Cl.
| | |
|---|---|
| B60L 53/63 | (2019.01) |
| B60L 53/53 | (2019.01) |
| B60L 53/62 | (2019.01) |
| H02J 7/00 | (2006.01) |
| B60L 58/13 | (2019.01) |

(52) U.S. Cl.
CPC ............ B60L 53/63 (2019.02); B60L 53/53 (2019.02); B60L 53/62 (2019.02); H02J 7/007182 (2020.01); B60L 58/13 (2019.02); H02J 7/0013 (2013.01); H02J 7/0031 (2013.01); H02J 7/0048 (2020.01); H02J 7/00712 (2020.01)

(58) Field of Classification Search
CPC .... H02J 7/007182; B60L 53/63; B60L 53/53; B60L 53/62

USPC ......................................................... 320/109
See application file for complete search history.

(56) References Cited

U.S. PATENT DOCUMENTS

| | | | | |
|---|---|---|---|---|
| 5,606,242 | A * | 2/1997 | Hull .................... | H02J 7/00036 429/432 |
| 7,145,312 | B2 * | 12/2006 | Lanni .................. | H02J 7/00712 320/114 |
| 7,768,229 | B2 * | 8/2010 | Zhang .................... | B60L 58/18 307/66 |
| 8,054,039 | B2 * | 11/2011 | Bauerle ................. | B60L 53/305 320/109 |
| 8,175,660 | B2 * | 5/2012 | Porwal .................... | H02J 50/80 455/343.1 |
| 8,478,452 | B2 * | 7/2013 | Pratt ....................... | H02J 3/241 700/297 |

(Continued)

OTHER PUBLICATIONS

International Search Report and Written Opinion for Application No. PCT/US2022/038802, dated Jan. 19, 2023.

(Continued)

*Primary Examiner* — John T Trischler
(74) *Attorney, Agent, or Firm* — MARSHALL, GERSTEIN & BORUN LLP

(57) ABSTRACT

Electric vehicle (EV) charging stations for: (i) preventing damage to a battery of an EV charging station, and (ii) maintaining fast charging of the battery of the EV charging station. An EV charging station controller determines if an input power to the EV charging station is above an input power threshold value, and, if so, determines if a charge level of the battery of the EV charging station is below a low charge threshold level. If the charge level is below the low charge threshold level, a portion of the input power may be reserved for the battery of the EV charging station.

19 Claims, 4 Drawing Sheets

(56) References Cited

U.S. PATENT DOCUMENTS

| | | | | |
|---|---|---|---|---|
| 8,700,225 | B2* | 4/2014 | Pratt | G05B 15/02 |
| | | | | 700/297 |
| 8,872,383 | B2* | 10/2014 | Kozakai | H02J 7/00034 |
| | | | | 307/104 |
| 9,045,047 | B2* | 6/2015 | Ito | B60L 53/53 |
| 9,153,847 | B2* | 10/2015 | Harty | B60L 53/53 |
| 9,276,490 | B2* | 3/2016 | Atkinson | H02M 7/02 |
| 9,559,521 | B1* | 1/2017 | King | H02J 9/06 |
| 9,592,742 | B1* | 3/2017 | Sosinov | B60L 53/68 |
| 9,608,451 | B2* | 3/2017 | Sugeno | B60L 53/53 |
| 9,627,911 | B2* | 4/2017 | Kinomura | B60L 53/64 |
| 9,753,440 | B2* | 9/2017 | Pratt | B60L 55/00 |
| 9,817,423 | B2* | 11/2017 | King | H02J 3/381 |
| 9,859,811 | B2* | 1/2018 | Atkinson | H02M 7/04 |
| 9,937,810 | B2* | 4/2018 | Saussele | H02J 3/144 |
| 9,994,118 | B2* | 6/2018 | Williams | B60L 58/12 |
| 9,994,237 | B2* | 6/2018 | Jestin | B60L 3/04 |
| 10,020,656 | B2* | 7/2018 | Saussele | H02J 4/00 |
| 10,040,363 | B2* | 8/2018 | Beaston | H02J 3/322 |
| 10,081,259 | B2* | 9/2018 | Yoko | H02J 7/0068 |
| 10,166,882 | B2* | 1/2019 | Yang | B60L 53/00 |
| 10,183,583 | B2* | 1/2019 | Narla | H02M 7/44 |
| 10,195,954 | B2* | 2/2019 | Becker | B60L 3/0023 |
| 10,286,787 | B2* | 5/2019 | Mazumdar | B60L 50/53 |
| 10,369,890 | B1* | 8/2019 | Sosinov | B60L 53/126 |
| 10,399,461 | B1* | 9/2019 | Sosinov | B60L 53/124 |
| 10,414,357 | B1* | 9/2019 | Sorensen | G05B 19/042 |
| 10,464,441 | B2* | 11/2019 | Yoko | H02J 7/34 |
| 10,620,679 | B2* | 4/2020 | Sultenfuss | H02J 7/0063 |
| 10,663,932 | B2* | 5/2020 | Pratt | B60L 53/68 |
| 10,682,925 | B2* | 6/2020 | Chan | B60L 53/63 |
| 10,763,678 | B2* | 9/2020 | Chan | B60L 53/665 |
| 10,814,741 | B2* | 10/2020 | Homma | B60L 53/665 |
| 10,836,273 | B2* | 11/2020 | Zhu | B60L 53/20 |
| 10,857,897 | B2* | 12/2020 | Narla | H02M 7/44 |
| 11,104,241 | B2* | 8/2021 | Chan | G06Q 50/40 |
| 11,135,985 | B2* | 10/2021 | Sorensen | H02J 13/00 |
| 11,192,465 | B2* | 12/2021 | Brombach | B60L 53/305 |
| 11,196,283 | B2* | 12/2021 | Gerrits | H02J 7/0024 |
| 11,264,825 | B1* | 3/2022 | Harris | B60L 53/305 |
| 11,456,605 | B2* | 9/2022 | Bartlett | H02J 50/80 |
| 11,511,635 | B2* | 11/2022 | Sosinov | G05D 1/0276 |
| 11,584,250 | B1* | 2/2023 | Palombini | H02J 7/0045 |
| 12,088,103 | B2* | 9/2024 | Kim | H02J 3/32 |
| 2004/0108833 | A1* | 6/2004 | Lanni | H02J 7/00712 |
| | | | | 320/116 |
| 2008/0067974 | A1* | 3/2008 | Zhang | B60L 53/63 |
| | | | | 903/907 |
| 2010/0156355 | A1* | 6/2010 | Bauerle | H02J 7/007194 |
| | | | | 320/152 |
| 2011/0006612 | A1* | 1/2011 | Kozakai | H02J 7/00034 |
| | | | | 307/104 |
| 2011/0090726 | A1* | 4/2011 | Brotto | H02J 7/007182 |
| | | | | 363/131 |
| 2011/0175569 | A1* | 7/2011 | Austin | B60L 53/126 |
| | | | | 320/109 |
| 2011/0245987 | A1* | 10/2011 | Pratt | H02J 13/00006 |
| | | | | 320/132 |
| 2012/0074901 | A1* | 3/2012 | Mohammed | B60L 53/11 |
| | | | | 320/109 |
| 2012/0200160 | A1* | 8/2012 | Pratt | B60L 53/305 |
| | | | | 307/48 |
| 2012/0326654 | A1* | 12/2012 | Ito | B60L 53/11 |
| | | | | 320/103 |
| 2013/0113413 | A1* | 5/2013 | Harty | H01M 10/465 |
| | | | | 320/109 |
| 2013/0264865 | A1* | 10/2013 | Sugeno | H02J 3/322 |
| | | | | 307/19 |
| 2013/0268132 | A1* | 10/2013 | Pratt | H02J 13/00 |
| | | | | 700/286 |
| 2013/0322138 | A1* | 12/2013 | Atkinson | H02M 7/02 |
| | | | | 363/74 |
| 2014/0320062 | A1* | 10/2014 | Murayama | B60L 53/63 |
| | | | | 320/134 |
| 2014/0354228 | A1* | 12/2014 | Williams | B60L 53/305 |
| | | | | 320/109 |
| 2015/0054466 | A1* | 2/2015 | Kinomura | B60L 53/68 |
| | | | | 320/134 |
| 2015/0165917 | A1* | 6/2015 | Robers | B60L 3/12 |
| | | | | 320/109 |
| 2015/0207316 | A1* | 7/2015 | Saussele | H02J 3/381 |
| | | | | 700/287 |
| 2015/0253789 | A1* | 9/2015 | Saussele | H02J 1/002 |
| | | | | 700/298 |
| 2015/0286965 | A1* | 10/2015 | Amano | B60L 53/68 |
| | | | | 705/5 |
| 2015/0333512 | A1* | 11/2015 | Saussele | G05F 1/10 |
| | | | | 700/287 |
| 2016/0006253 | A1* | 1/2016 | Saussele | H02J 3/38 |
| | | | | 307/24 |
| 2016/0009191 | A1* | 1/2016 | Becker | B60L 53/60 |
| | | | | 320/152 |
| 2016/0028229 | A1* | 1/2016 | Mitsutani | H02M 3/158 |
| | | | | 307/82 |
| 2016/0126856 | A1* | 5/2016 | Atkinson | G06F 1/26 |
| | | | | 363/74 |
| 2016/0152151 | A1* | 6/2016 | Yang | B60L 58/27 |
| | | | | 320/109 |
| 2016/0167678 | A1* | 6/2016 | Jestin | B60L 50/40 |
| | | | | 318/504 |
| 2016/0185246 | A1* | 6/2016 | Paul | B60L 53/65 |
| | | | | 320/106 |
| 2016/0214491 | A1* | 7/2016 | Yoko | B60L 53/20 |
| 2017/0106764 | A1* | 4/2017 | Beaston | B60L 53/31 |
| 2017/0168516 | A1* | 6/2017 | King | H02J 3/32 |
| 2017/0222437 | A1* | 8/2017 | Pratt | B60L 58/13 |
| 2018/0037121 | A1* | 2/2018 | Narla | H02J 7/35 |
| 2018/0111493 | A1* | 4/2018 | Chan | G01R 19/10 |
| 2018/0154791 | A1* | 6/2018 | Homma | B60L 55/00 |
| 2018/0361859 | A1* | 12/2018 | Yoko | H02J 7/02 |
| 2019/0070970 | A1* | 3/2019 | Chan | B60L 53/65 |
| 2019/0073012 | A1* | 3/2019 | Sultenfuss | H02J 7/0068 |
| 2019/0135116 | A1* | 5/2019 | Narla | B60L 8/003 |
| 2019/0190306 | A1* | 6/2019 | Sosinov | H02J 7/14 |
| 2019/0207398 | A1* | 7/2019 | Shih | B60L 53/53 |
| 2019/0389315 | A1* | 12/2019 | Zhu | B60L 53/64 |
| 2020/0031238 | A1* | 1/2020 | Kydd | H02J 9/062 |
| 2020/0044467 | A1* | 2/2020 | Sosinov | H01M 10/44 |
| 2020/0139838 | A1* | 5/2020 | Chan | B60L 53/63 |
| 2020/0307404 | A1* | 10/2020 | Chan | B60L 53/63 |
| 2020/0321797 | A1* | 10/2020 | Gerrits | B60L 53/52 |
| 2020/0377042 | A1* | 12/2020 | Sorensen | H04W 4/44 |
| 2021/0039516 | A1* | 2/2021 | Brombach | H02J 3/12 |
| 2021/0170897 | A1* | 6/2021 | Ellis | B60L 53/68 |
| 2021/0273453 | A1* | 9/2021 | Nishio | B60L 50/50 |
| 2021/0281091 | A1* | 9/2021 | Bartlett | H02J 7/00032 |
| 2021/0331599 | A1* | 10/2021 | Hishida | H02J 3/32 |
| 2021/0370792 | A1* | 12/2021 | Sato | B60L 53/665 |
| 2021/0394693 | A1* | 12/2021 | Sorensen | B60R 16/03 |
| 2022/0069611 | A1* | 3/2022 | Harris | B60L 53/305 |
| 2022/0166233 | A1* | 5/2022 | Pizzurro | B60L 53/62 |
| 2022/0258634 | A1* | 8/2022 | Okabe | B60L 58/12 |
| 2022/0266713 | A1* | 8/2022 | Aslan | H01G 11/16 |
| 2023/0031352 | A1* | 2/2023 | Yan | H02J 7/0048 |
| 2023/0033955 | A1* | 2/2023 | Seroff | B60L 53/62 |
| 2023/0055592 | A1* | 2/2023 | Kim | H02J 7/342 |
| 2023/0191936 | A1* | 6/2023 | Erikson | B60L 53/16 |
| | | | | 320/109 |
| 2023/0202336 | A1* | 6/2023 | Lu | B60L 53/67 |
| | | | | 320/109 |

OTHER PUBLICATIONS

Ray et al. "Modeling and power management of electric vehicle charging system." 2021 International Conference on Smart-Green

(56) References Cited

OTHER PUBLICATIONS

Technology in Electrical and Information Systems (ICSGTEIS). IEEE, 2021.

* cited by examiner

DYNAMIC OUTPUT CONTROL OF VEHICLE CHARGERS WITH RESPECTIVE INTERNAL BATTERIES

TECHNICAL FIELD

The following relates to electric vehicle (EV) charging stations, and, more particularly, to controlling EV charging based upon the state of charge (SOC) of an EV charging station battery to prevent damage to the battery.

BACKGROUND

Batteries in current EV charging stations sustain damage when their SOC falls to a low level (e.g., less than 10%, etc.). For example, a low SOC may cause a voltage drop across the battery, which damages the battery. In addition, batteries in current EV charging stations are much slower to charge when their SOC falls to a low level. For example, it takes much longer to charge an EV station battery from 0% to 5% than from 10% to 20%. The systems and methods disclosed herein provide solutions to these problems and others.

SUMMARY

Embodiments disclosed herein provide systems, methods, and apparatuses that prevent damage to a battery of an EV charging station, and that further maintain fast charging on the battery of the EV charging station. As described further herein, electric vehicle (EV) charging station controller of an EV charging station may be provided; such an EV charging station controlled may be configured to cause the EV charging station to: measure an input power, wherein the input power is a power received from a power source at an input port of the EV charging station; determine if the input power is above an input power threshold value; when the input power is above the input power threshold value, measure a battery charge level of a battery of the EV charging station; determine if the battery charge level is below a low charge threshold level; and when the battery charge level is below the low charge threshold level, reserve, for the battery, a portion of the input power to charge the battery with.

In some embodiments, the low charge threshold level is approximately ten percent of a full charge level of the battery. In further embodiments, the low charge threshold level is set to a value between nine percent and eleven percent of a full charge level of the battery. In some embodiments, the EV charging station controller is further configured to cause the EV charging station to: set the low charge threshold level to be a level received via a user interface of the EV charging station, or received via a user device.

In some embodiments, the input power threshold value is zero Watts. In some embodiments, the EV charging station controller is further configured to cause the EV charging station to: cause an EV to be charged with a non-reserved portion of the input power; and cause the EV charging station battery to be charged with the reserved portion of the input power. In further embodiments, the reserved portion of the input power is ten percent of the input power, and the non-reserved portion of the input power is ninety percent of the input power.

In some embodiments, the EV charging station controller is further configured to cause the EV charging station to: when the battery charge level is below the low charge threshold level, further cause the EV to be charged using only the input power and not using the battery. In further embodiments, the EV charging station controller is further configured to cause the EV charging station to: when the battery charge level is above the low charge threshold level, cause an EV to be charged according to a power output requested by the EV.

In some embodiments, the input power threshold value is a first input power threshold value, and the EV charging station controller is further configured to cause the EV charging station to: determine if the input power is above a second input power threshold value; and when the input power is above the second input power threshold value, enable multiple charging heads of the EV charging station. In further embodiments, the EV charging station controller is further configured to cause the EV charging station to: when the input power is below the input power threshold value, disable charging of an EV.

In another aspect, an electric vehicle (EV) charging station configured to prevent battery damage may be provided. The EV charging station may comprise: an EV charging station battery; and one or more processors. The EV charging station may further include a non-transitory program memory communicatively coupled to the one or more processors and storing executable instructions that, when executed by the one or more processors, cause the EV charging station to: measure an input power, wherein the input power is a power received from a power source at an input port of the EV charging station; determine if the input power is above an input power threshold value; when the input power is above the input power threshold value, measure a battery charge level of the EV charging station battery; determine if the battery charge level is below a low charge threshold level; and when the battery charge level is below the low charge threshold level, reserve, for the EV charging station battery, a portion of the input power to charge the EV charging station battery.

In some embodiments, the low charge threshold level is approximately ten percent of a full charge level of the battery. In further embodiments, the instructions, when executed, further cause the EV charging station to: set the low charge threshold level to a level received from a user device.

In some embodiments, the instructions, when executed, further cause the EV charging station to: cause an EV to be charged with a non-reserved portion of the input power; and cause the EV charging station battery to be charged with the reserved portion of the input power. In further embodiments, the instructions, when executed, further cause the EV charging station to: when the battery charge level is above the low charge threshold level, cause an EV to be charged according to a power output requested by the EV.

In yet another aspect a computer-implemented method for preventing damage to a battery of an electric vehicle (EV) charging station may be provided. The method may comprise: measuring, by one or more sensors of the EV charging station, an input power, wherein the input power is a power received from a power source at an input port of the EV charging station; determining, by an EV charging station controller of the EV charging station, that the input power is above an input power threshold value; in response to the determination that the input power is above the input power threshold value, determining, by the EV charging station controller, a battery charge level of the battery of the EV charging station; determining, by the EV charging station controller, that the battery charge level is below a low charge threshold level; and in response to determining that the battery charge level is below the low charge threshold level, reserving, by the EV charging station controller, a portion of the input power to charge the battery.

In some embodiments, the low charge threshold level is approximately ten percent of a full charge level of the battery. In further embodiments, the method further includes: receiving, at the EV charging station controller, an indication from a user device of a level for the low charge threshold level; and setting, by the EV charging station controller, the low charge threshold level to match the indication of the low charge threshold level received from the user device. In still further embodiments, the method further includes: charging, via a charging head, an EV with a non-reserved portion of the input power; and charging the battery with the reserved portion of the input power.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The techniques described herein generally relate to preventing damage to a battery in an electric vehicle (EV) charging station through controlling charging of EVs based upon the state of charge (SOC) of the battery. The techniques described herein also advantageously allow a battery of an EV charging station to charge more quickly in some scenarios.

More particularly, a battery in an EV charging station may have an SOC indicating a charge level of the battery (e.g., an SOC of 100% indicating the battery is fully charged, an SOC of 50% indicating the battery is half charged, an SOC of 0% indicating the battery is fully discharged, etc.). If the SOC falls too low, two problems may occur. First, the battery may be damaged (e.g., the low SOC causes a voltage drop across the battery, which damages the battery). Increasing levels of damage occur with increasing probability as the SOC falls below about 10%, 5%, and 1%. Second, when their SOC falls to a low level, batteries in current EV charging stations are much slower to charge. For example, it takes much longer to charge an EV station battery from 0% to 5% than from 10% to 20%.

Some embodiments described herein solve these problems by preventing the EV charging station battery from dropping to a low level. For example, in some embodiments, when an SOC of an EV charging station battery falls to a low level, a portion of the input power is reserved to charge the battery with. In some embodiments, the actions of the system are further dependent on an input power to the EV charging station.

Example System

Figure 1:
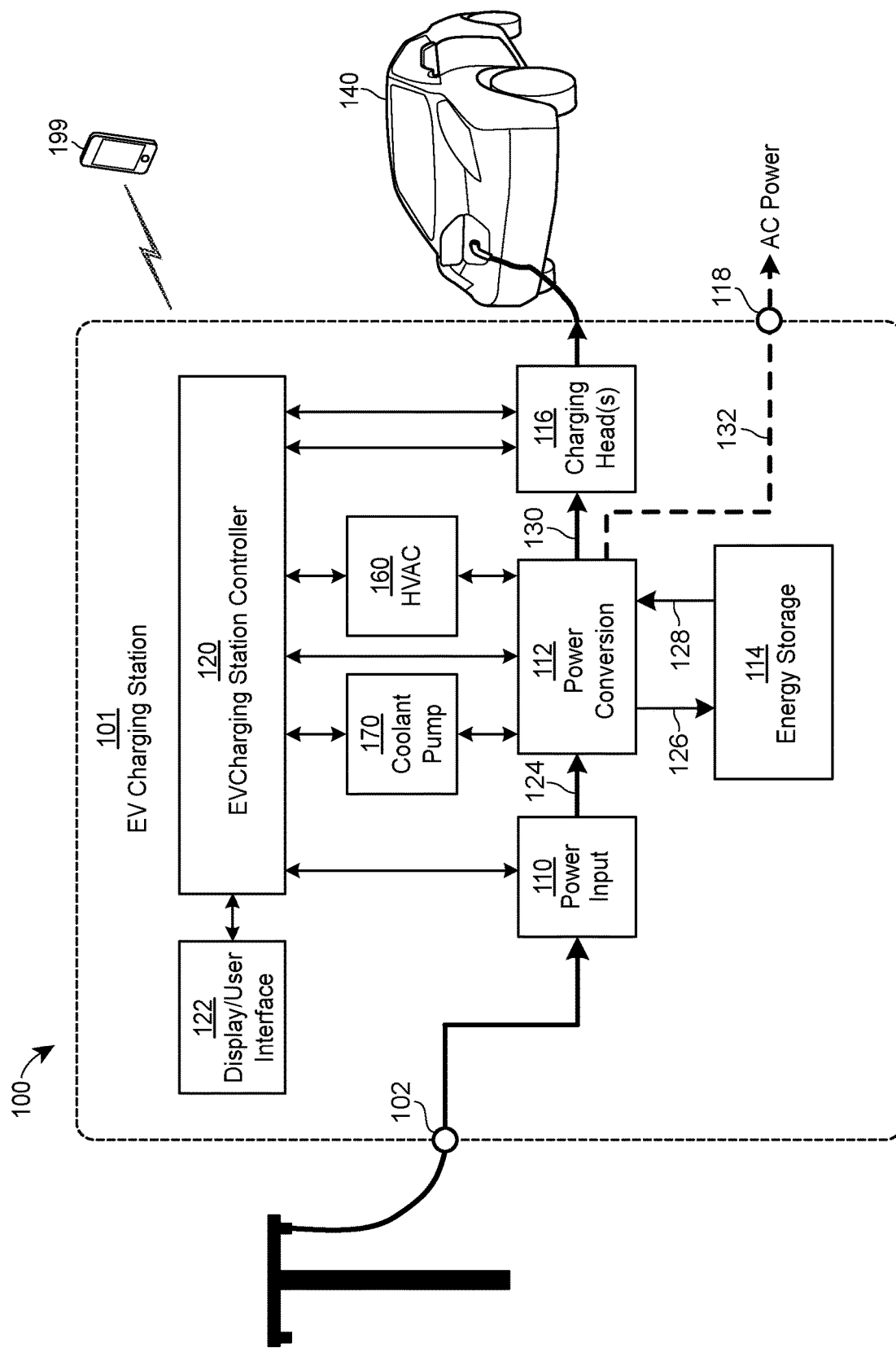
FIG. 1 illustrates an example of an electric vehicle charging system configured in accordance with certain aspects disclosed herein.

An example of a system to prevent damage to an EV charging station battery is illustrated in the example EV charging system 100 of FIG. 1. The EV charging system 100 may prevent damage to the energy storage module 114, such as by preventing damage to one or more batteries of the energy storage module 114.

The illustrated EV charging system 100 may include EV charging station 101, and may be provided in a residence, commercial property or publicly-accessible parking facility. The EV charging system 100 includes a power input module 110 that includes one or more circuits configurable to transform, condition or otherwise modify alternating current (AC) power received from an input port 102, to provide conditioned power 124 to a power conversion module 112. The power conversion module 112 includes an AC-to-DC conversion circuit that generates a DC charging current 126 that is provided to an energy storage module 114. In various embodiments, the power input module 110 and the power conversion module 112 may be combined, or their functions may be differently configured (e.g., by converting the input AC power to DC power at the power input module 110). In one example, the energy storage module 114 includes high-capacity batteries that have a storage capacity greater than a multiple of the storage capacity in the EVs to be charged (e.g., three times, five times, or ten times a specific or average EV battery capacity).

In a residential implementation where N EVs are expected to receive a daily charge of P kW on a regular basis, the energy storage module 114 may have a storage capacity of at least (N+1)×P kW in order to accommodate the expected daily demand. In some instances, P may be set to the maximum charge capacity of each of the EVs. In other instances, the storage capacity of the energy storage module 114 may be configured based on expected usage of the EVs and resultant daily depletion in charge.

In an EV charging system 100 provided for commercial or public use, the storage capacity of the energy storage module 114 may be configured based on the maximum number of expected charging events in a day. The maximum number of expected charging events in a day may be calculated based on times of day in which the EV charging system 100 is made accessible. The storage capacity of the energy storage module 114 may further be configured based on the expected average charge per charging event, which may depend upon factors such as the types of EVs charged, the depletion level of the EV batteries when charging starts, and the duration of each charging event. For example, a retail parking site may have more charging events of shorter duration, while a commuter train parking lot may have fewer charging events of longer duration.

In various examples, the storage capacity of the energy storage module 114 may be configured based on maximum expected charging offset by power received from an electric utility. In some of these examples, the power received from an electric utility may be limited to power available during low-demand times, such as off-peak or low-priced periods of the day. The power input module 110 may be configured to block or disconnect inflows of power during peak or high-priced periods of the day. In some instances, the power input module 110 may be configured to enable power reception during peak periods to ensure continued operation of the EV charging system 100 when power levels in the energy storage module 114 are unexpectedly low.

According to certain aspects of this disclosure, the power conversion module 112 may include one or more DC-to-DC conversion circuits that receive DC current 128 at a first voltage level from the energy storage module 114 and drive a charging current 130 to an EV 140 through a charging head 116. The EV charging system 100 may be coupled to multiple charging heads 116 and the power conversion module 112 may include a corresponding number of DC-to-DC conversion circuits. In some instances, the charging head(s) 116 may include power control circuits that further modify or control the voltage level of the charging current 130 passed through to the EV 140.

In some examples, the power conversion module 112 includes one or more inverters that convert the DC current 128 to an AC current 132 that can be provided at an AC output 118 of the EV charging system 100. The AC output 118 may be used to power one or more external charging heads or may be provided as backup power source for more general use. For example, the AC output 118 may comprise an outlet into which AC devices may be plugged or a direct connection to one or more devices or circuits in order to provide backup power at the site of the EV charging system 100.

According to certain aspects of this disclosure, an EV charging station controller 120 may be configured to control operations of the power conversion module 112. The EV charging station controller 120 may monitor and control power levels received by the power input module 110, power levels output through the charging current 130 and/or the AC current 132 and energy levels in the energy storage module 114. The EV charging station controller 120 may monitor temperatures within the EV charging system 100 and/or within different components of the EV charging system 100 and may be configured to mitigate increases in temperature through active cooling (e.g., using one or more HVAC components 160 or coolant pumps 170) or power reductions (e.g., by reducing currents 126, 128, or 130).

The EV charging station controller 120 may be configured to communicate with the components of the EV charging system 100, including power conversion, inverter and power conditioning circuits over one or more data communication links. The EV charging station controller 120 may be configured to communicate with controllers or sensors coupled to the energy storage module 114, the charging head 116 and external devices, including an EV being charged. The EV charging station controller 120 may manage, implement or support one or more data communication protocols used to control communication over the various communication links. The data communication protocols may be defined by industry standards bodies or may be proprietary protocols.

In some examples, the EV charging station controller 120 is implemented as a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

In some examples, the power conversion module 112 includes some combination of AC-to-DC, DC-to-DC and/or DC-to-AC converters that enables efficient conversion of AC input power received from a power utility to a DC charging current 126 provided to the energy storage module 114 and from the energy storage module 114 to EV 140. In one example, an inverter may be configured to achieve greater efficiency and cost effectiveness while enabling at least 150 kW charging levels, in contrast to the 120 kW levels provided by other systems.

The EV charging station 101 may also include a user interface module 122 that can receive tactile or spoken input and can display information related to the operation of the EV charging system 100. The user interface module 122 may include or be coupled to a display with capabilities that reflect intended use of the EV charging system 100. In one example, a large nineteen-inch touchscreen may be provided to present details of charging status and user instructions, including instructions describing the method of connecting an EV 140. In another example, a small (four to six inch) LCD panel and display may be provided by the EV charging system 100. The user interface module 122 may include or be coupled to a touchscreen that interacts with the EV charging station controller 120 to provide additional information or advertising. The EV charging station controller 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options and for other purposes.

Through the user interface module 122, the EV charging station controller 120 may provide information to enable the user to start charging, to confirm the start of charging, and to track the status of charging and so on. The user interface module 122 may support various input devices, including identity cards, touchless credit cards and other devices that interact through near-field communication protocols. The user interface module 122 may support user authentication protocols and may include or be coupled to biometric input devices such as fingerprint scanners, iris scanners, facial recognition systems and the like.

Furthermore, the user interface module 122 may display a visual and/or auditory indication and/or alarm when the SOC of a battery of the energy storage module 114 falls below a certain level (e.g., falls below a low charge threshold level). The user interface module 122 may further be used to set controls of the EV charging station 101 (e.g., by sending control signals to the EV charging station controller 120), such as setting any threshold levels, etc.

In one aspect of this disclosure, the energy storage module 114 is provisioned with a large battery pack and the EV charging station controller 120 is controlled by software that is configured to manage input received from an electrical power grid to the battery pack such that power is drawn from the grid to charge the battery pack at low-cost time periods and to avoid drawing power from the grid during peak-cost hours. The software may be further configured to manage power output to provide full, fast charging power in accordance with usage generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicles throughout the course of a day or in other situations in which battery pack capacity is expected to be insufficient to fully charge all EVs over a time interval, taking account of the ability to add charge to the energy storage module 114.

In some examples, the energy storage module 114 may include additional air cooling for the battery pack and/or liquid cooling for the space surrounding the battery pack. Thermal blankets may also be used for warming batteries in cold conditions, and metal plates can be added to act as buffers and/or as additional heat sinks for cooling. In some examples, the liquid cooling may be provided by the coolant pump 170, which may be controlled by the EV charging station controller 120.

In one example, the energy storage module 114 is provisioned with a battery pack that can deliver 160 kWh can charge a series of EVs 140 without significant delays between EVs 140 and without the energy storage module 114 falling below 50% capacity. The battery pack may be fully recharged during the lowest-cost periods of the day when local grid demand is lowest, which may correspond to late night or early morning hours. The EV charging system 100 may draw power from the electric grid at normal residential levels (e.g., <30 kW) and may be used at virtually all existing premises without utility upgrades, construction costs and associated delays in approvals, permits, construction projects for such upgrades.

In certain examples, one or more EV charging systems 100 may be prefabricated and preconfigured, such that they can be installed within a few hours of delivery. Each EV charging system 100 occupies a small footprint and can be connected directly to an existing utility service access point provided on the premises. Installation of these EV charging systems 100 may be accomplished after providing conduit as needed from electrical service access points, and bolting the EV charging systems 100 to the ground or to a wall. The EV charging systems 100 can charge EVs 140 within hours of installation. In one example, an EV charging system 100 is enclosed in single metal housing that integrates batteries, inverters, power conversion circuits, wiring harnesses and control systems including the EV charging station controller 120 and other components of a battery management system (BMS).

It should be appreciated that two or more charging heads 116 may be provided to enable concurrent charging of multiple EVs 140. The EV charging station controller 120 may be configured by a user to support multiple modes of operation and may define procedures for power distribution that preserve energy levels in the energy storage module 114 when multiple EVs 140 are being concurrently charged. Distribution of power may be configured to enable fast charging of one or more EVs 140 at the expense of other EVs 140. In this regard, the charging ports may be prioritized or the EV charging station controller 120 may be capable of identifying and prioritizing connected EVs 140. In some instances, a user may identify priorities dynamically through the user interface module 122. For example, the EV charging station controller 120 may be configured to continue charging a first EV 140 at a maximum 120 kW when a second EV 140 is connected to a charging port, and may refrain from charging the second EV 140 until the charging rate for the first EV 140 drops below 60 kW. Reductions in charging rate may be configured to prevent thermal issues as the EV 140 approaches full charge. In this example, a 120 kW available power level may be split according to priorities.

In other examples, the EV charging station controller 120 may be configured to automatically split available power between two EVs 140 after the second EV 140 is connected. The available power may be evenly split between two EVs 140 or may be split according to priorities or capabilities. In some examples, the EV charging station controller 120 may conduct arbitration or negotiation between connected EVs to determine a split of charging capacity. An EV 140 may request a charging power level at any given moment based on temperature, battery charge level, and other characteristics of the EV 140 and its environment and to achieve maximum charge rate and minimum charging time for the current circumstances.

Figure 2:
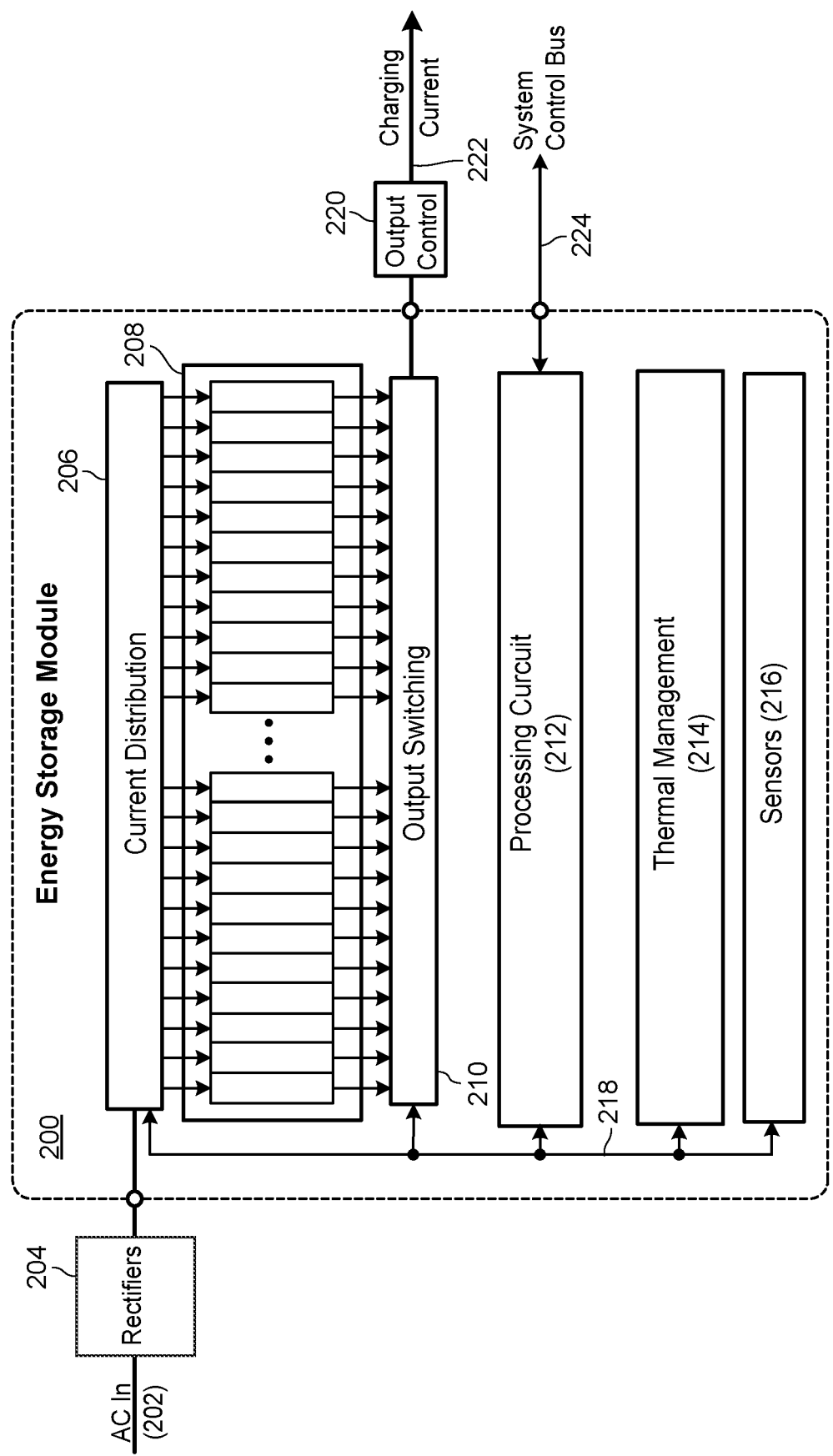
FIG. 2 illustrates an example of an energy storage module configured in accordance with certain aspects of this disclosure.

FIG. 2 illustrates an example of an energy storage module 200 configured in accordance with certain aspects of this disclosure. The energy storage module 200 may correspond to the energy storage module 114 illustrated in FIG. 1, for example. The energy storage module 200 may receive DC power derived from an AC input 202. The AC input 202 may be converted to DC by one or more power conversion circuits. Power conversion circuits may include one or more circuits configurable to transform, condition or otherwise modify the AC input 202 to provide a conditioned DC power output. For example, a generalized power conversion module includes an AC-to-DC conversion circuit that generates a DC charging current. In the illustrated example, the power conversion circuits are represented as a block of rectifiers 204. Multiple power conversion circuits may be provided, with each power conversion circuit being individually controlled to provide a charging current to one or more batteries in a battery pack 208. The power conversion circuits may be controlled or configured to optimize the charging process for each battery or group of batteries in the charging battery pack 208.

The battery pack 208 may be configurable to select groups of batteries to provide charging currents to corresponding EVs during EV charging operations. Each group of batteries may be associated with a conversion circuit. In some instances, a best available conversion circuit may be dynamically selected to charge a group of batteries. Dynamic selection may match available conversion circuits to groups of batteries based on current demand by the group of batteries, current delivery capabilities of the conversion circuits, temperature and other operating conditions of the conversion circuits, and/or for other reasons. A current distribution module 206 may include switching circuits that can couple the outputs of groups of batteries to designated conversion circuits.

The outputs of the batteries in the battery pack 208 may be provided to an output switching circuit 210 that is configured to couple one or more batteries or groups of batteries to provide a charging current 222. The number of batteries or groups of batteries used to provide the charging current 222 may be selected based on capacity of the batteries, current output levels of the batteries and current levels requested by the EV that is being charged. An output control circuit 220 may be provided to deliver output power at a consistent voltage and wattage. The output control circuit 220 may include DC-to-DC converters such as buck and boost circuits that change voltage level of the battery output, filters to remove transients and sensors that can be used to increase or decrease the number of batteries used to produce the charging current 222.

The current distribution module 206, output switching circuit 210, the output control circuit 220 and a thermal management module 214 may respond to commands and control signals provided by a processing circuit 212 that is configured to manage operation of the energy storage module 200. To effect such control and to receive operating data regarding the energy storage module 200, the processing circuit 212 may be communicatively connected to the current distribution module 206, the output switching circuit 210, the thermal management module 214, and sensors 216 by an internal bus 218. The processing circuit 212 may cooperate with external processors to determine and activate configurations of batteries to use for charging an EV, and the processing circuit 212 may be communicatively connected to such external processors via a system control bus 224. In one example, the processing circuit 212 is configured as a finite state machine. In some examples, the processing circuit 212 includes a programmable logic controller (PLC), microcontroller, microprocessor or other type of processor.

The processing circuit 212 may be configured to limit input current flow based on the capacity of a provisioned utility service that provides the AC input 202. In one example, the processing circuit 212 may limit input current to remain with a 30 kW ceiling for a circuit provided by a power utility company. The processing circuit 212 may be further configured to manage power flows when, for example, an EV is drawing 120 kW or more and while the AC input 202 is supplying 30 kW or less. In some embodiments, power flows may be managed by configuring groups of batteries used to provide a desired or requested charging current 222 and switching between groups of batteries when depletion is imminent or when the requested level of the charging current 222 changes.

The thermal management module 214 may include, control, configure or manage the operation of cooling and heating elements, such as HVAC components 160 or coolant pumps 170, which are used to maintain temperatures within minimum and maximum limits defined for the batteries and associated circuits. The heating and cooling elements may include forced air components such as fans or impellers, a coolant supply that is circulated through channels, pipes or ducts within the energy storage module 200, compressors and other components of thermodynamic systems that provide a Carnot cycle, heat pumps, heat exchangers radiant heaters, induction heaters, burners and so on. Cooling may be activated due to environmental conditions or when heat generation by the components of the energy storage module 200 increase internal temperatures. Cooling may be activated due to environmental conditions when external temperatures drop to levels that preclude battery or ancillary circuit operation.

The thermal management module 214 may include or be connected to sensors 216. Certain sensors 216 may be configured to monitor operating conditions within and without the thermal management module 214. Certain sensors 216 may be configured to monitor current flows, battery capacity and/or stored energy levels. The output of the sensors 216 may be monitored by or through the processing circuit 212. In some instances, sensor data may be directly monitored by external processors. In some instances, certain sensors 216 may trigger an event or alarm that causes the processing circuit 212 to immediately terminate operations of the energy storage module 200. In one example, an emergency shutdown may be indicated by an over-temperature, over-current or over-voltage condition. In another example, an emergency shutdown may be executed in response to a command or signal received from an external source such as a facilities management system via a system control bus 224.

Example Methods

Figure 3:
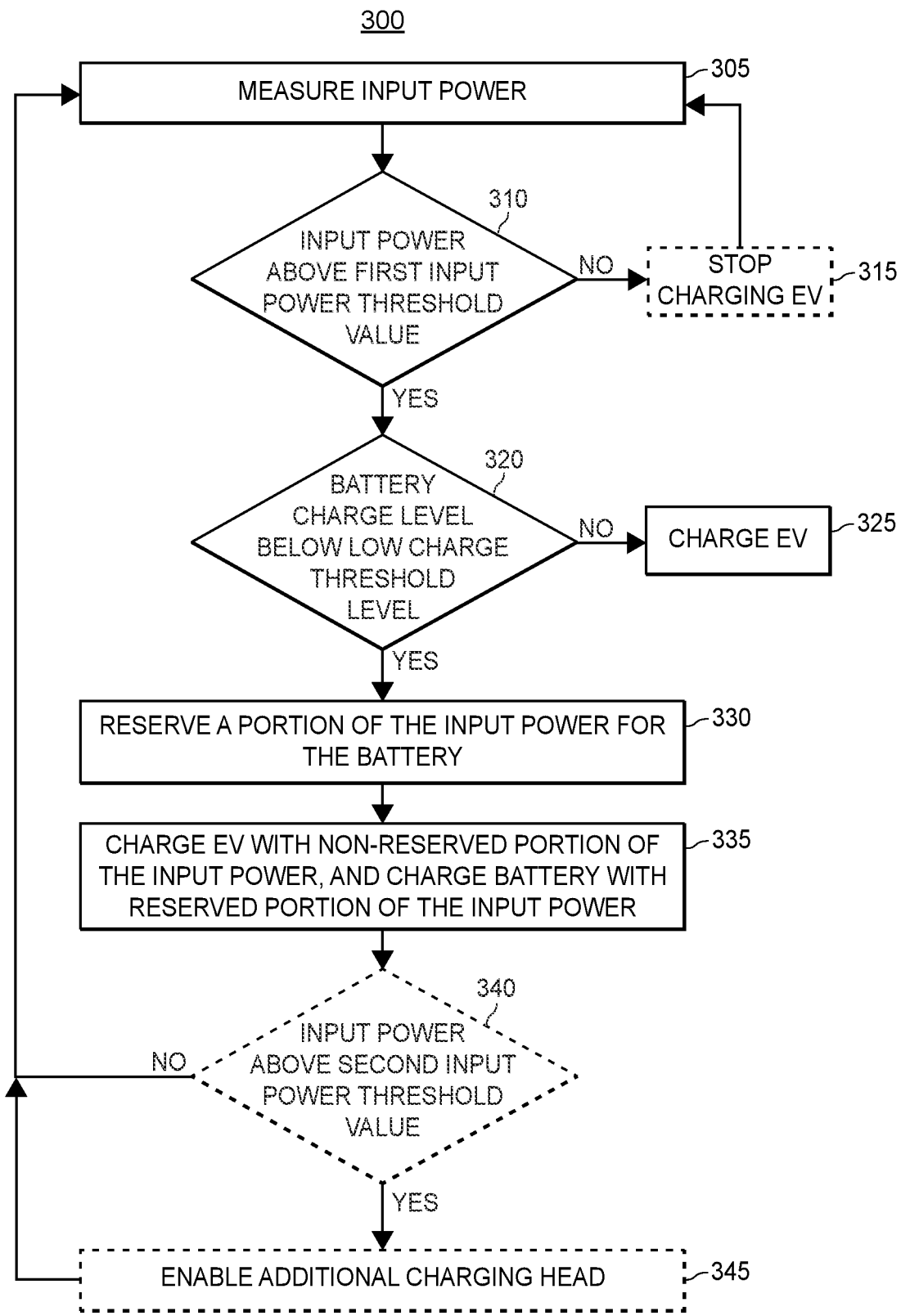
FIG. 3 is a flowchart of an example method for preventing damage to an EV charging station battery.

FIG. 3 is a flowchart of a method 300 for preventing damage to an EV charging station battery. It should be appreciated that, in the following discussion, battery refers to any EV charging station battery, such as a battery of the energy storage module 114 or of the energy storage module 200.

At block 305, the EV charging station controller 120 may measure an input power corresponding to an input of the EV charging station 101. Such input power may be measured using one or more sensors disposed at the input port 102 or the power input 110, which may be communicatively connected to provide a measurement signal to the EV charging station controller 120. For example, the input power may be the power at the power input 110. Thus, in some examples, the input power is the power received from the input port 102. However, additionally or alternatively to receiving power from the electrical grid (e.g., receiving power via input port 102), the power input 110 may receive power from other source(s), such as a solar panel. Thus, in some examples, the input power is the total power that the power input 110 receives (e.g., the power received from the electrical grid and/or solar panel(s)).

At decision block 310, the EV charging station controller 120 determines if the measured input power is above a first input power threshold. In some examples, the first input power threshold is approximately 0 W, and thus this determination is essentially being made simply to determine that the EV charging station 101 is receiving any power at all. In another example, the first input power threshold is set at an average or expected power level used by the various system components of the EV charging station 101, thus representing the level of input power required to prevent depleting the one or more EV charging station batteries due to system operation of the EV charging station 101 while not charging an EV 140. In other examples, the first input power threshold is set closer to an expected value to be received from the electrical power grid (e.g., the expect power to be received from the grid is 14 kW, so the first input power threshold is set to 14 kW, or 13 kW, etc.). In some embodiments, the first input power threshold value may be set or adjusted by a user (e.g., a charging site operator) at various times (e.g., via the user interface 122; or via a user device 199, such as a smartphone, communicatively coupled to the EV charging station controller 120), such as during installation or initial configuration or periodic reconfiguration of the EV charging station 101.

If the determination at block 310 indicates the input power is not above the first input power threshold, optionally, the EV charging station controller 120 stops charging any EV(s) 140 currently charging (e.g., disables charging of an EV via the charging head 116) (block 315). Advantageously, this may prevent damage to the battery by preventing the battery charge level (e.g., battery SOC) from dropping too low. However, in some embodiments, at block 315, the EV charging station controller 120 makes a determination of the SOC of the battery, and continues to charge the EV 140 until the SOC of the battery is depleted to a predetermined level (e.g., a charge level of 15%, 10%, etc.), at which point the EV charging station controller 120 stops charging the EV 140. The example method 300 may then return to block 300.

If the determination at block 310 indicates the input power is above the first input power threshold, the EV charging station controller 120 determines if the battery charge level of the battery is below a low charge threshold (e.g., 1% SOC, 9% SOC, 10% SOC, 11% SOC, 15% SOC, etc.) at block 320. In some embodiments, a user (e.g., a charging site operator) may set or adjust the low charge threshold (e.g., via the user interface 122; or via a user device 199, such as a smartphone, communicatively coupled to the EV charging station controller 120). If no user selection of a low charge threshold has been received by the EV charging station controller 120, a default low charge threshold (e.g., 5% or 10%) may be used for the determination.

If the determination at block 320 indicates the battery SOC is not below the low charge threshold, the EV(s) 140 are charged normally at block 325. For example, the EV(s) 140 may be charged according to a power level(s) requested by the EV(s) 140. Alternatively, the EV(s) 140 may instead be charged at a static value (e.g., 10 kW, 14 kW, 20 kW, etc.). Additionally or alternatively, the EV(s) 140 may be charged according to any of the other rates and/or techniques discussed herein. It should be understood that, in some embodiments, the power used to charge the EV(s) 140 comes from the power input 110 and/or energy storage module 114.

If the determination at block 320 indicates the battery SOC is below the low charge threshold, the EV charging station controller 120 may reserve a portion of the input power for the battery (block 330). The portion may be any suitable portion of the input power to ensure normal standby operation of the EV charging station 101 does not deplete the battery. In some embodiments, the reserved portion is determined as a percentage of the input power (e.g., 5% or 10% of the measured input power). In further embodiments, the reserved portion is an absolute power level, such as an average power requirement of the various system component of the EV charging station 101 in a standby mode in which no EV 140 is being charged (e.g., 100 W or 2 kW, depending on configuration and operation of heating or cooling components within the charging station). In some embodiments, a user (e.g., a charging site operator) may set the portion reserved power (e.g., via the user interface 122; or via a user device 199, such as a smartphone, communicatively coupled to the EV charging station controller 120). In yet further embodiments, the portion of the input power reserved may be varied based upon the SOC of the battery and/or the measured input power according to a predefined logic (e.g., using a plurality of SOC and/or input power thresholds or one or more equations) in order to allow maximum EV charging while ensuring the SOC remains above the low charge threshold. For example, if the reserved portion is 10% of the input power when the SOC is below the low charge threshold level of 10%, the reserved portion may be increased to 50% if the SOC further falls below 7%.

At block 335, the EV charging station controller 120 charges the EV(s) 140 with the non-reserved portion of the input power, and charges the battery with the reserved portion of the input power. For example, the reserved portion may be 10% of the measured input power so that the battery is charged with 10% of the input power and the EV(s) 140 are charged with the remaining 90% of the input power. Furthermore, in some embodiments, the EV(s) 140 are charged only with the input power, and not with any power from the battery. In some embodiments, only one EV 140 is permitted to be charged (e.g., only one charging head 116 is activated) while the SOC is below the low charge threshold. In other embodiments, more than one EV 140 may be charged (e.g., more than one charging head 116 is activated), with the non-reserved portion of the input power being divided equally or unequally between multiple EVs 140.

At optional block 340, the EV charging station controller 120 determines if the input power is above a second input power threshold. (It may be noted that in some embodiments where optional block 340 is not performed, following block 335, the example method 300 may return to block 305.) One purpose of this determination is to assess whether the EV charging station 101 is capable of handling charging of additional EVs 140. The second input power threshold value may be any suitable value, such as 10 kW, 20 kW, 30 kW, 40 kW, etc. In some embodiments, a user (e.g., a charging site operator) may set the second input power threshold (e.g., via the user interface 122; or via a user device 199, such as a smartphone, communicatively coupled to the EV charging station controller 120).

If the determination at block 340 indicates the input power is not above the second input power threshold, the example method 300 returns to block 305. If the determination at block 340 indicates the input power is above the second input power threshold, the EV charging station controller 120 enables an additional charging head 116 (block 340) (e.g., to thereby enable the charging of an additional EV 140). Upon enabling the additional charging head 116, the example method 300 returns to block 305.

Further regarding the example flowchart 300 provided above, it should be noted that all blocks are not necessarily required to be performed. Moreover, additional or alternative blocks may be performed although they are not specifically illustrated in the example flowchart 300.

Exemplary Implementation of Vehicle Charging System

Figure 4:
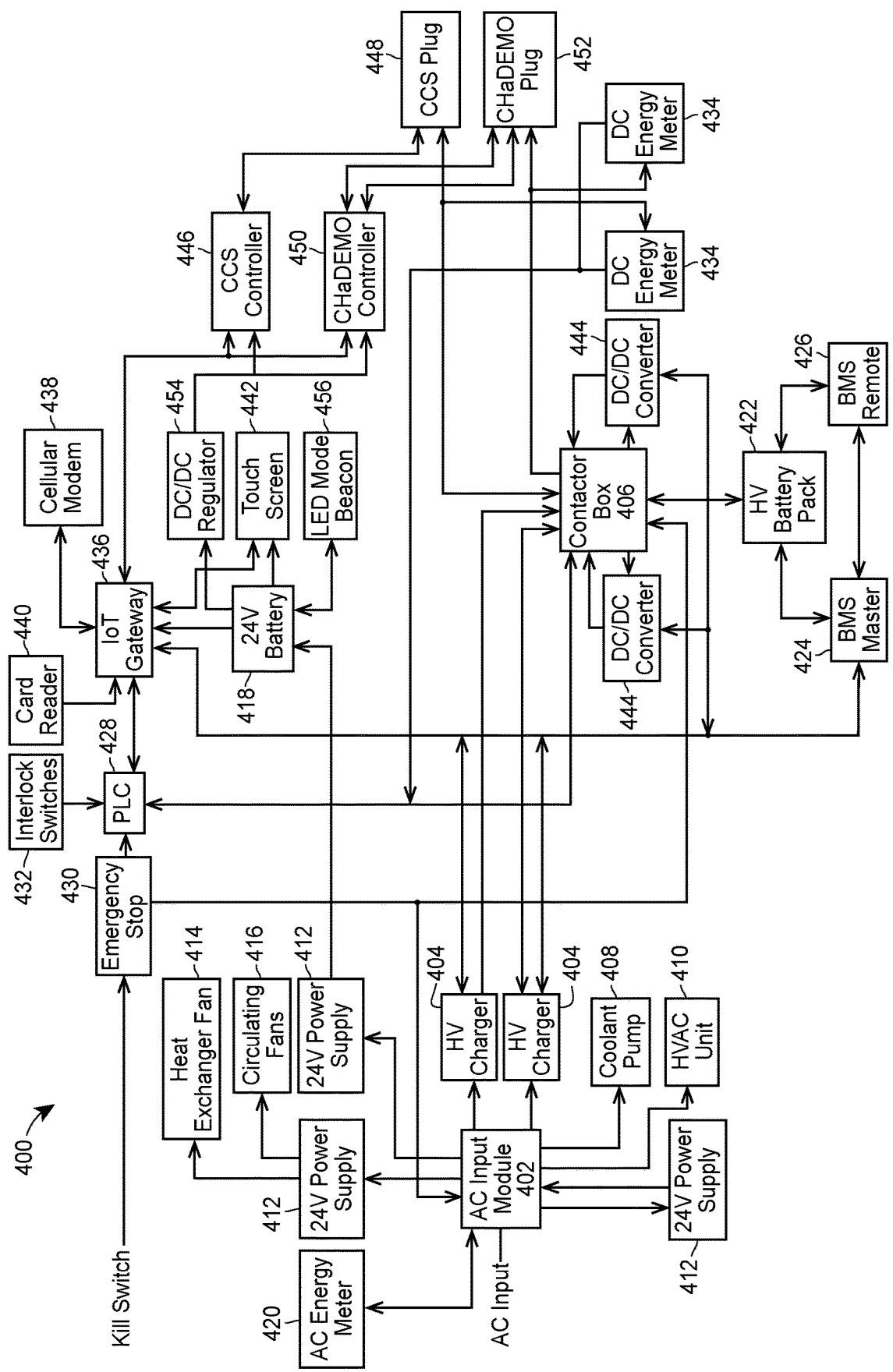
FIG. 4 shows a block schematic diagram of an example of an EV charging system configured in accordance with certain aspects of this disclosure.

FIG. 4 shows a block schematic diagram of certain components in an example EV charging system 400. The vehicle charging system 400 receives power at an AC input module 402 from an AC input power source, such as a 120V or 240V single-phase or three-phase electric power grid connection. The AC input module 402 provides the received AC current to a plurality of high-voltage (HV) chargers 404, which convert the AC current to a high-voltage DC current that is then provided to a contactor box 406 for further storage and use in vehicle charging. In addition to providing the received AC current to the HV chargers 404, the AC input module 402 provides power to a plurality of thermal management components, either directly or indirectly. In the illustrated example, the AC input module 402 provides 120V AC current directly to coolant pump 408 and HVAC unit 410. The AC input module 402 provides indirect power to additional components through 24V power supplies 412, which convert the 120V AC current from the AC input module 402 into 24V DC current. The 24V power supplies 412 provide DC current to thermal management components such as a heat exchanger fan 414 and one or more circulating fans 416, as well as to a 24V battery 418. In some examples, the AC input module 402 may include one or more converter circuits to transform, condition or otherwise modify AC input current to provide conditioned AC power to the various components. The AC input module 402 is also connected to an AC energy meter 420 that monitors AC power consumption by the vehicle charging system 400. In some examples, the AC energy meter 420 may further monitor energy consumption at a site where the vehicle charging system 400 is located. The AC energy meter 420 may provide energy usage data to one or more local or remote processing circuits via wired or wireless communication channels (not shown) to facilitate control of charging the HV battery pack 422.

The HV battery pack 422 receives DC power from the contactor box 406, stores the received energy in one or more individual batteries, and provides DC power to the contactor box 406 in order to charge vehicles. The HV battery pack 422 is controlled by a battery management system (BMS), which may include a BMS master controller 424 that provides primary control and a BMS remote controller 426 that provides remote monitoring and analysis of the HV battery pack 422. The contactor box 406 provides power to and receives power from the HV battery pack 422 based upon control commands from a programmable logic controller (PLC) 428 via an I/O connection. The PLC 428 may comprise one or more processors implementing control logic to receive input signals and provide output signals, including control signals to the contactor box 406. The PLC 428 may communicate such signals over one or more communication connections, such as an I/O circuit or a system bus. The PLC 428 receives input signals or data from the contactor box 406, an emergency stop 430 configured to rapidly shut-off charging in response to actuation of a kill switch, one or more interlock switches 432 configured to indicate physical connections of various components within the vehicle charging system 400 (e.g., to shut-off charging when an access panel of the system is opened for maintenance), DC energy meters 434 configured to measure DC energy provided via the charging heads, and an Internet of Things (IoT) Gateway 436. The PLC 428 receives data signals from and provides data signals to each of the contactor box 406 and the IoT gateway 436 in order to monitor relevant conditions and control operation of the vehicle charging system 400.

The IoT gateway 436 serves as a central hub for communication between the PLC 428 and various components of the vehicle charging system 400, as well as for communication with external components via a cellular modem 438 or other electronic communication components. The cellular modem 438 facilitates electronic communication with remote data sources and/or remote control sources, such as a centralized management system configured to manage a plurality of EV charging stations 101. Some such data sources may include IoT devices installed within or external to the vehicle charging system 400. In some embodiments, the PLC 428 receives or generates operating data regarding the vehicle charging system 400 and causes the cellular modem 438 to transmit such operating data to remote servers via the IoT gateway 436. The IoT gateway 436 also communicates with local user interface components, such as a card reader 440 and a touch screen 442, to enable a user to operate the vehicle charging system 400. A user may also operate the vehicle charging system 400 via signals sent from a user computing device (e.g., a smartphone or an onboard computing system of a vehicle) to the cellular modem 438 (e.g., via an Internet connection). The IoT gateway 436 may be configured to communicate with components of the system via a local bus in order to receive operating data from and/or to send control signals to the HV chargers 404, the BMS master controller 424, and one or more DC/DC converters 444 configured to convert between a battery voltage level of the HV battery pack 422 and a charging voltage level used to charge a vehicle.

Additionally, the IoT gateway 436 communicates with one or more charging head controllers, each associated with a vehicle charging plug. In the illustrated example, the IoT gateway 436 communicates with a combined charging system (CCS) controller 446 connected to a CCS plug 448 and also communicates with a CHaDEMO controller 450 connected to a CHaDEMO plug 452. Each of the charging head controllers (i.e., the CCS controller 446 and the CHaDEMO controller 450) is powered by the 24V battery 418 through a DC/DC regulator 454 in order to control the supply of charging current to a vehicle through the respective vehicle charging plug. Each of the CCS plug 448 and the CHaDEMO plug 452 is also connected to the contactor box 406 to receive the charging current. To supply the charging current, the contactor box 406 is controlled by the PLC 428 to actuate switches to connect groups of batteries from the HV battery pack 422 to one or more DC/DC converters 444, which may include power conversion circuits such as buck and boost circuits that change voltage level of the battery output and other components to filter or otherwise condition the output charging current for charging a vehicle. In some examples, a first DC/DC converter 444 is configured to provide charging current suitable for the CCS plug 448, while a second DC/DC converter is configured to provide charging current suitable for the CHaDEMO plug 452.

The 24V battery 418 provides power to the DC/DC regulator 454, the IoT gateway 436, the touch screen 442, and an LED mode beacon 456 to ensure temporary continued operation for a short duration in the event of loss of power from the AC input. Likewise, the 24V battery 418 may provide power to the PLC 428 either directly or through the IoT gateway 436. The LED mode beacon may present visual indications of the current operating status of the vehicle charging system 400 via one or more LED lighting elements in order to signal availability, unavailability, charge level, or other relevant information to users or potential users of the system.

Other Matters

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. An electric vehicle (EV) charging station controller of an EV charging station, comprising one or more processors configured to cause the EV charging station to:
   measure an input power, wherein the input power is a power received from a power source at an input port of the EV charging station;
   determine if the input power is above an input power threshold value;
   when the input power is above the input power threshold value, measure a battery charge level of a battery of the EV charging station;
   determine if the battery charge level is below a low charge threshold level;
   when the battery charge level is below the low charge threshold level, reserve a portion of the input power to charge the battery; and
   charge the battery with the reserved portion of the input power regardless of a power output requested by an EV;
   wherein the input power threshold value is a first input power threshold value, and wherein the EV charging station controller is further configured to cause the EV charging station to:
   determine if the input power is above a second input power threshold value; and
   when the input power is above the second input power threshold value, enable multiple charging heads of the EV charging station.

2. The EV charging station controller of claim 1, wherein the low charge threshold level is approximately ten percent of a full charge level of the battery.

3. The EV charging station controller of claim 1, wherein the low charge threshold level is set to a value between nine percent and eleven percent of a full charge level of the battery.

4. The EV charging station controller of claim 1, further configured to cause the EV charging station to:
   set the low charge threshold level to be a level received via a user interface of the EV charging station or received via a user device.

5. The EV charging station controller of claim 1, wherein the input power threshold value is zero Watts.

6. The EV charging station controller of claim 1, further configured to cause the EV charging station to:
   when the battery charge level is below the low charge threshold level, further cause the EV to be charged using only the input power and not using a charge stored in the battery.

7. The EV charging station controller of claim 1, further configured to cause the EV charging station to:
   when the battery charge level is above the low charge threshold level, cause the EV to be charged according to the power output requested by the EV.

8. The EV charging station controller of claim 1, further configured to cause the EV charging station to:

when the input power is below the input power threshold value, disable charging of the EV.

9. The EV charging station controller of claim 1, further configured to cause the EV charging station to:
cause the EV to be charged with a non-reserved portion of the input power.

10. The EV charging station controller of claim 9, wherein the reserved portion of the input power is ten percent of the input power, and a non-reserved portion of the input power is ninety percent of the input power.

11. An electric vehicle (EV) charging station configured to prevent battery damage, the EV charging station comprising:
an EV charging station battery;
one or more processors; and
a non-transitory program memory communicatively coupled to the one or more processors and storing executable instructions that, when executed by the one or more processors, cause the EV charging station to:
measure an input power, wherein the input power is a power received from a power source at an input port of the EV charging station;
determine if the input power is above an input power threshold value;
when the input power is above the input power threshold value, measure a battery charge level of the EV charging station battery;
determine if the battery charge level is below a low charge threshold level;
when the battery charge level is below the low charge threshold level, reserve, for the EV charging station battery, a portion of the input power to charge the EV charging station battery; and
charge the battery with the reserved portion of the input power regardless of a power output requested by an EV;
wherein the input power threshold value is a first input power threshold value, and wherein the instructions, when executed, further cause the EV charging station to:
determine if the input power is above a second input power threshold value; and
when the input power is above the second input power threshold value, enable multiple charging heads of the EV charging station.

12. The EV charging station of claim 11, wherein the low charge threshold level is approximately ten percent of a full charge level of the battery.

13. The EV charging station of claim 11, wherein the instructions, when executed, further cause the EV charging station to:
set the low charge threshold level to a level received from a user device.

14. The EV charging station of claim 11, wherein the instructions, when executed, further cause the EV charging station to:
cause the EV to be charged with a non-reserved portion of the input power.

15. The EV charging station of claim 11, wherein the instructions, when executed, further cause the EV charging station to:
when the battery charge level is above the low charge threshold level, cause the EV to be charged according to the power output requested by the EV.

16. A computer-implemented method for preventing damage to a battery of an electric vehicle (EV) charging station, the method comprising:
measuring, by one or more sensors of the EV charging station, an input power, wherein the input power is a power received from a power source at an input port of the EV charging station;
determining, by an EV charging station controller of the EV charging station, that the input power is above an input power threshold value;
in response to the determination that the input power is above the input power threshold value, determining, by the EV charging station controller, a battery charge level of the battery of the EV charging station;
determining, by the EV charging station controller, that the battery charge level is below a low charge threshold level;
in response to determining that the battery charge level is below the low charge threshold level, reserving, by the EV charging station controller, a portion of the input power to charge the battery; and
charging the battery with the reserved portion of the input power regardless of a power output requested by an EV;
wherein the input power threshold value is a first input power threshold value, and wherein the method further comprises:
determining, by the EV charging station controller, that the input power is above a second input power threshold value; and
in response to determining that the input power is above the second input power threshold value, enabling, by the EV charging station controller, multiple charging heads of the EV charging station.

17. The computer-implemented method of claim 16, wherein the low charge threshold level is approximately ten percent of a full charge level of the battery.

18. The computer-implemented method of claim 16, further comprising:
receiving, at the EV charging station controller, an indication from a user device of a level for the low charge threshold level; and
setting, by the EV charging station controller, the low charge threshold level to match the indication of the low charge threshold level received from the user device.

19. The computer-implemented method of claim 16, further comprising:
charging, via a charging head, the EV with a non-reserved portion of the input power.

* * * * *